United States Patent [19]

Roby

[11] 4,045,395

[45] Aug. 30, 1977

[54] ADHESIVE COMPOSITION

[75] Inventor: Ray I. Roby, Medford, Oreg.

[73] Assignee: Roby's Enterprises, Inc., Medford, Oreg.

[21] Appl. No.: 662,736

[22] Filed: Mar. 1, 1976

[51] Int. Cl.² ............................................. C08L 91/00
[52] U.S. Cl. ...................... 260/28.5 AS; 260/28.5 AV
[58] Field of Search ................ 260/28.5 AS, 28.5 AV

[56] References Cited

U.S. PATENT DOCUMENTS

| | | | |
|---|---|---|---|
| 3,835,117 | 9/1974 | Walaschek | 260/28.5 AS |
| 3,846,362 | 11/1974 | Reinecke et al. | 260/28.5 AS |
| 3,897,380 | 7/1975 | Walaschek | 260/28.5 AS |

*Primary Examiner*—Melvyn I. Marquis
*Attorney, Agent, or Firm*—Kolisch, Hartwell, Dickinson & Stuart

[57] ABSTRACT

A water impervious surfacing composition which includes cement and sand and a mixture of an aqueous coal tar emulsion and an aqueous polyvinyl acetate emulsion.

4 Claims, No Drawings

ADHESIVE COMPOSITION

This invention relates to adhesive and surfacing compositions, which have been demonstrated to be substantially impervious to water.

The usual concrete comprising Portland cement, sand, and gravel is an extremely versatile building material and has found wide applications for use. While it is not intended to minimize the importance of concrete as a building material in this present day, one problem which has arisen and which, to date, has not been practically solved, is the resurfacing of a concrete structure after the same has become eroded by the effects of weather, traffic, etc. As is well known, a Portland cement mortar-type mix cannot be applied directly to a concrete surface, as such will not adhere permanently to the concrete and very soon will separate and crack. Attempts to produce a better result by applying a mastic or other adhesive to the concrete a preliminary coating have not been entirely successful. Surfacing compositions have also been proposed comprising a mixture of Portland cement, sand and a material such as a polyvinyl acetate emulsion, but these again have not proved a satisfactory answer, by reason of the apparent lack of permanent resistance to water exhibited by the emulsion, evidenced by the coating tending to crumble and erode away after weathering. Such compositions have proved to be totally unsatisfactory, for instance in the context of repairing swimming pool surfaces or paved areas adjacent a pool with the ever present water associated with such conditions.

This invention is based upon the discovery that a substantially impervious surfacing composition may be prepared from a Portland cement-type mix comprising Portland cement and sand, which includes within the mix a controlled amount of a coal tar emulsion and polyvinyl acetate emulsion. Quite surprisingly, while polyvinyl acetate emulsion has been employed alone with cement and sand in a patching material, with the polyvinyl acetate tending to dissolve after a time span with breakup of the patch, and while coal tar emulsions generally have not been suggested for use in conjunction with concrete surfaces when the two are combined into a Portland cement and sand mix, a surfacing composition of plastic, i.e., workable consistency, is produced, which may be applied directly to a cleaned, but eroded concrete structure to form after the same is cured and hardened a coat which is permanently bonded to the concrete, which is apparently substantially completely impervious to water, and which will withstand heavy traffic and extreme weathering conditions without disintegrating The surfacing composition of the invention, therefore, has many uses including the repair of pool surfaces, paved areas and patios. Furthermore, while the advantages of the surfacing composition are extremely evident in connection with the repairing of concrete structures, the material also apparently adheres well to other materials such as asphalt, wood, steel, etc. indicating uses in other than concrete repair. In this connection, it has been noted that when the same is spread on steel, the steel becomes protectively coated and shows no evidence of rusting even after long periods of time.

In the usual instance, the compositon of the invention is prepared by initially mixing the coal tar emulsion and the polyvinyl acetate emulsion with the addition, if desired, of additional water to produce the desired liquidity in the mixture. The mixture of coal tar emulsion and polyvinyl acetate emulsion exhibits good adhesive characteristics and may, therefore, be employed as an adhesive for securing articles of wood, steel, plastic, etc. together with a good bond produced which is water-resistant. In preparing the surfacing composition of the invention, this mix of coal tar emulsion and polyvinyl acetate emulsion (which normally will contain a ratio of water to combined coal tar nonvolatiles and polyvinyl acetate solids in the mix within the range of about 2:1 to 4:1) is then intimately mixed with cement and sand to produce the surfacing composition. When the composition is applied, as in the case of making repairs, the water in the emulsion combines with the cement in the production of the hard material which characterizes concrete, with the coal tar and polyvinyl acetate emulsion together introducing an adhesive quality combined with water imperviousness which is a characteristic of the surfacing material of the invention. Exactly what occurs in the production of the hardened coat between the various constituents is not entirely understood, but it is clear that the surfacing composition produces a hard, wear-resistant, water impervious coat which permanently adheres to the surface being repaired and which produces a satisfactory answer to a problem which heretofore has never been practically solved.

These and other objects and advantages of the invention will become more fully apparent from a reading of the following description, taken in conjunction with specific examples of preparation set forth herein.

Coal tar emulsion, also sometimes referred to as coal tar pitch emulsion, as is well known, is prepared from coal tar which is a mixture of condensable, volatile products formed during the destructive distillation of bituminous coal. The composition of the usual coal tar is variable, but generally it consists of from 2% to 8% light oils, chiefly benzene, toluene, xylene, from 8% to 10% middle oils, chiefly phenols, cresols and naphthalene, from 8% to 10% heavy oils, such as naphthalene and derivatives, from 16% to 20% anchracene oils, and about 50% pitch. An aqueous emulsion is prepared from such material utilizing, in addition to water, an emulsifier such as sodium soap.

A coal tar emulsion exemplary of the emulsion which may be used in the practice of the instant invention conforms to the specifications set forth in Federal Specification RP 355D, dated Apr. 16, 1965. Such an emulsion has the following chemical and physical properties: water — 53%, coal tar nonvolatiles — 47%, ash of coal tar nonvolatiles — 30 —40%, solubility of coal tar nonvalatiles in $CS_2$ — 20%, specific gravity 25°C./25° C. — 1.20.

Illustrative of the polyvinyl acetate emulsion which may be employed practicing the instant invention is the polyvinyl acetate emulsion marketed under the trade name PLYAMUL by Reichold Chemicals, Inc. Set forth below are the specifications of PLYAMUL 40—153 produced by Reichold Chemicals, Inc.

| Emulsion Type | Vinyl acetate homopolymer |
|---|---|
| Total Solids | 54–56% |
| Emulsion Viscosity (Brookfield RVT, No. 3 Spindle, 20 RPM, 25° C.) | 1,800–2,200 cps. |
| pH (at 25° C.) | 4.5 minimum |
| lbs./Gallon | 9.2 |
| Particle Size | Ranging primarily from 2 to 6 microns |
| Free monomer | 0.7% maximum |

In practicing the instant invention, it is usual to prepare initially a mix of the coal tar emulsion and the polyvinyl acetate emulsion. The proportion of ingredients employed in this mix or fraction are such that the ratio of the coal tar nonvolatiles to polyvinyl acetate solids in the mix ranges from 0.3 to 2.5:1. The water in the emulsion and any additional water that it may be desired to add normally places the ratio of the water to combined coal tar nonvolatiles and polyvinyl acetate solids in the emulsion mix within the range of about 2 to 4:1.

In preparing the surfacing composition, the adhesive composition just described is blended with a mix of Portland cement and sand, to produce a plastic, i.e., workable, mix of approximately the consistency of mortar which can be applied directly to a clean concrete or other surface such as asphalt which it is desired to repair. As contemplated by a preferred embodiment of the invention, the mix is prepared by mixing with one part cement from 3 to 6 parts sand, and a sufficient amount of the coal tar and polyvinyl acetate emulsion mix just described to introduce from 0.25 to 1.25 parts combined coal tar nonvolatiles and polyvinyl acetate solids. The water in the final mix usually falls within the range of 1 to 4 parts. Parts herein, unless otherwise indicated, refer to parts by weight.

If desired, small amounts of additional materials may be included, such as a coloring pigment exemplified by titanium dioxide, included for the purpose of creating a certain color in the surfacing composition. In this connection, the surfacing composition, by the addition of appropriate pigment may be prepared in shades of green, white, brown, etc.

Illustrating a specific embodiment of the invention, and adhesive or emulsion mix was prepared by admixing 5½ parts of the coal tar pitch emulsion earlier described (53% water, 47% coal tar nonvolatiles), 12 parts polyvinyl acetate emulsion (PLYAMUL, 55% solids, 45% water), and 16½ parts water. The ratio of coal tar nonvolatiles to polyvinyl acetate solids in this emulsion mix was calculated to be 0.39:1.

A water impervious surfacing composition was prepared by mixing together 1 part Portland cement, 4.5 parts of sand, and 2 parts of an adhesive composition or emulsion mix prepared as set forth above. The parts combined coal tar nonvolatiles and polyvinyl acetate solids in the total mix was calculated to be approximately 0.54. The parts of water in the total mix was calculated to be 1.46.

A surfacing composition prepared as above, was used in the refinishing of a concrete swimming pool. After nearly a year's time, no delamination, cracking or other deterioration was noted in the repaired area of the pool.

In another utilization of the composition, the composition was spread on a portion of interstate highway I—5 in southern Oregon which is surfaced in concrete. After approximately 9 months, no delamination, cracking or breakup of the coated area was observed.

It is claimed and desired to secure by Letters Patent:

1. A water-resistant adhesive composition which is essentially a mixture of an aqueous coal tar emulsion having a nonvolatile content by chemical analysis and an aqueous polyvinly acetate emulsion having a solids content by chemical analysis, the ratio of the coal tar nonvolatiles to polyvinyl acetate solids in said mixture ranging from about 0.3 to 2.5:1, and sufficient water to produce a ratio of water to combined coal tar nonvolatiles and polyvinyl acetate solids in said composition within the range of about 2 to 4:1.

2. A water impervious surfacing composition comprising 1 part cement, 3 to 6 parts sand, and a sufficient amount of the composition recited in claim 1 to introduce from 0.25 to 1.25 parts combined coal tar nonvolatiles and polyvinyl acetate solids.

3. A cement base, water impervious surfacing composition which is essentially a mixture of 1 part cement, 3 to 6 parts sand, from 0.75 to 3 water, nonvolatiles of an aqueous coal tar emulsion, and the solids of an aqueous polyvinyl acetate emulsion, said composition containing from 0.25 to 1.25 parts combined coal tar nonvolatiles and polyvinyl acetate solids, the ratio of coal tar nonvolatiles to polyvinyl acetate solids ranging from about 0.3 to 2.5:1.

4. The surfacing composition of claim 3 wherein the polyvinyl acetate solids exceeds the coal tar emulsion nonvolatiles.

* * * * *